United States Patent
Ozsoylu et al.

(10) Patent No.: US 6,978,860 B2
(45) Date of Patent: Dec. 27, 2005

(54) METHOD AND SYSTEM FOR ELECTRIC POWER STEERING

(75) Inventors: Suat Ali Ozsoylu, Rochester Hills, MI (US); Jon D. Demerly, Byron, MI (US); Farhad Bolourchi, Novi, MI (US); Tomy Sebastian, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/816,404

(22) Filed: Apr. 1, 2004

(65) Prior Publication Data

US 2005/0217922 A1      Oct. 6, 2005

(51) Int. Cl.[7] .................................. B62D 5/04
(52) U.S. Cl. ........................................ 180/444
(58) Field of Search .................... 180/444, 443; 74/388 PS; 318/661

(56) References Cited

U.S. PATENT DOCUMENTS

| | | | | |
|---|---|---|---|---|
| 4,726,437 A | * | 2/1988 | Norton | 180/444 |
| 5,010,970 A | * | 4/1991 | Yamamoto | 180/444 |
| 5,732,791 A | * | 3/1998 | Pinkos et al. | 180/444 |
| 5,927,428 A | * | 7/1999 | Nagao et al. | 180/444 |
| 6,380,658 B1 | | 4/2002 | Sebastian et al. | 310/261 |
| 6,382,344 B1 | * | 5/2002 | Lohner et al. | 180/444 |
| 6,460,649 B2 | | 10/2002 | Chen et al. | 180/443 |
| 6,498,451 B1 | | 12/2002 | Boules et al. | 318/661 |
| 6,499,559 B2 | | 12/2002 | McCann et al. | 180/446 |
| 6,705,424 B2 | * | 3/2004 | Ogawa et al. | 180/446 |
| 6,763,907 B2 | * | 7/2004 | Ueno et al. | 180/444 |

* cited by examiner

Primary Examiner—Tony Winner
(74) Attorney, Agent, or Firm—Michael D. Smith

(57) ABSTRACT

An electric power steering system, comprising: a steering wheel in operable communication with a mechanical linkage; a steering shaft in operable communication with the mechanical linkage, and in operable communication with at least one road wheel; a first transmission in operable communication with the steering shaft; a unidirectional electric motor in operable communication with the first transmission; wherein the electric power steering system is configured such that when the steering wheel is turned in a first direction, the motor's power is transmitted in the first direction to the steering shaft, and when the steering wheel is turned in a second direction, the motor's power is transmitted in the second direction to the steering shaft. A method for providing power assist for an electric power steering system, the method comprising: rotating a first body in a first direction with a unidirectional motor; rotating a second body in a second direction with the unidirectional motor; providing a power assist from the first body when a steering wheel is turned in a first direction; and providing a power assist from the second body when a steering wheel is turned in a second direction.

21 Claims, 6 Drawing Sheets

METHOD AND SYSTEM FOR ELECTRIC POWER STEERING

BACKGROUND

The disclosed method and system relates generally to a power steering system, more particularly, to a method and system for an electric power steering system.

Electric power steering ("EPS") has been the subject of development by auto manufacturers and suppliers for well over a decade, due in part to its potential advantages of fuel economy and ease-of-control when compared with traditional hydraulic power steering ("HPS"). However, commercialization of EPS systems has been slow and is presently limited due to cost and performance challenges. Among the most challenging technical issues are the pulsating feel at the steering wheel and the audible noise associated with the type of high performance electric drives needed to meet steering requirements.

Current EPS systems use expensive components to reduce the pulsating feel at the steering wheel and audible noise associated with the electric drives. These expensive components include, but are not limited to: a high powered controller, a low inertia motor, and very high precision gears and bearings.

SUMMARY

The disclosed system relates to an electric power steering system, comprising: a steering wheel in operable communication with a mechanical linkage; a steering shaft in operable communication with the mechanical linkage, and in operable communication with at least one road wheel; a first transmission in operable communication with the steering shaft; a unidirectional electric motor in operable communication with the first transmission; wherein the electric power steering system is configured such that when the steering wheel is turned in a first direction, the motor's power is transmitted in the first direction to the steering shaft, and when the steering wheel is turned in a second direction, the motor's power is transmitted in the second direction to the steering shaft.

The disclosed system also relates to an electric power steering system, comprising: a steering wheel in operable communication with at least one road wheel; a first transmission in operable communication with the at least one road wheel; a unidirectional electric motor in operable communication with the first transmission; wherein the electric power steering system is configured such that when the steering wheel is turned in a first direction, the motor's power is transmitted in the first direction to the at least one road wheel, and when the steering wheel is turned in a second direction, the motor's power is transmitted in the second direction to at least one road wheel.

The disclosed method relates to providing power assist for an electric power steering system, the method comprising: rotating a first body in a first direction with a unidirectional motor; rotating a second body in a second direction with the unidirectional motor; providing a power assist from the first body when a steering wheel is turned in a first direction; and providing a power assist from the second body when a steering wheel is turned in a second direction.

The disclosed method also relates to providing power assist for an electric power steering system, the method comprising: rotating a first body in a first direction with a unidirectional motor; rotating a second body in a first direction with a unidirectional motor; contacting a driven disk with the first body in order to turn the driven disk in a second direction when a steering wheel is turned in a second direction thereby providing a power assist to a steering shaft in the second direction; and contacting a driven disk with the second body in order to turn the driven disk in a third direction when a steering wheel is turned in a third direction thereby providing a power assist to the steering shaft in the third direction.

Additionally, the disclosed method relates to providing power assist for an electric power steering system, the method comprising: rotating a driver body in a first direction with a unidirectional motor; changing the contact angle between the driver body and a driven body such that the driver body turns the driven body in a second direction when a steering wheel is turned in a fourth direction thereby providing a power assist to a steering shaft in the fourth direction; and changing the contact angle between the driver body and a driven body such that the driver body turns the driven body in a third direction when a steering wheel is turned in a fifth direction thereby providing a power assist to a steering shaft in the fifth direction.

BRIEF DESCRIPTION OF DRAWINGS

Referring to the exemplary drawings wherein like elements are numbered alike in the several Figures.

DETAILED DESCRIPTION

By going back to the fundamentals of how a conventional HPS system operates, a simplified EPS system has been created that does not require the expensive components mentioned. The disclosed solution is an electric motor equivalent to a conventional hydraulic system in which there is a power source (hydraulic pump) moving an inertia (hydraulic fluid) in a single direction and then mechanically directing (through a hydraulic valve) the kinetic energy from the inertia to provide assist to the driver in the desired direction.

Figure 1:
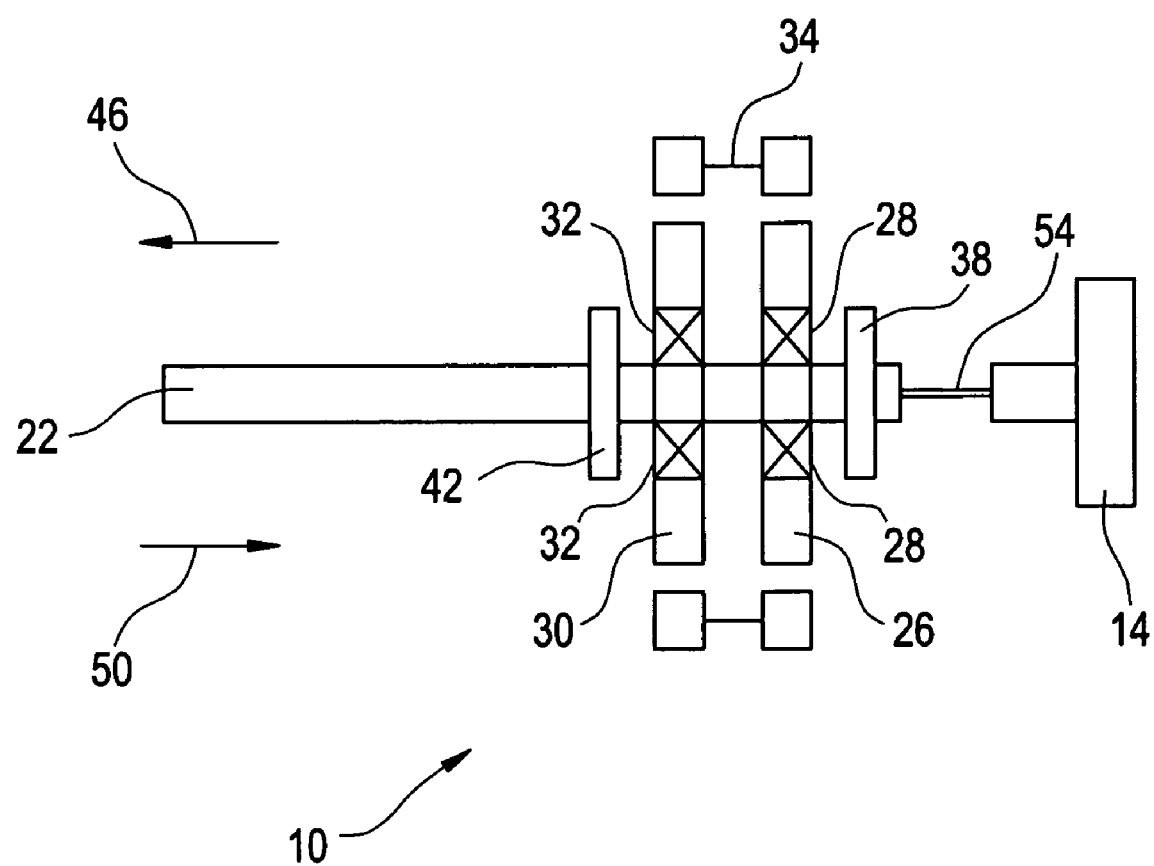
FIG. 1 is a schematic view of a flywheel embodiment of the disclosed electric power system.

Referring to FIG. 1, one embodiment of the disclosed steering system 10 is shown. A steering wheel 14 is in operable communication with a first linkage 54. The first linkage 54 converts rotational displacement of the steering wheel to linear movement of the linkage and steering shaft 22. The first linkage 54 may comprise a torsion bar and a cam. The cam may be selected from any of a number of cam devices, including, but not limited to: a ball in helical groove, 4-bar linkage, and ball screw. The first linkage 54 is in operable communication with a steering shaft 22. The steering shaft is in operable communication with at least one road wheel (not shown). A first flywheel 26 and a second flywheel 30 are in operable communication with the steering shaft 22 via a first bearing 28 and a second bearing 32, respectively. The bearings 28, 32 are configured to allow the shaft 22 to move axially with respect to the flywheels 26, 30 while allowing the flywheels 26, 30 to rotate freely about the steering shaft 22. A motor 34 is in operable communication with both the first flywheel 26 and second flywheel 30. Through a torque transfer system, such as, but not limited to, a gear system, the motor 34 is configured to rotate the first and second flywheels 26,30 in opposite directions. In this embodiment, the first flywheel may be configured to rotate counter-clockwise, as one looks from the steering wheel 14 to the steering shaft 22. The second flywheel may be configured to rotate clockwise, as one looks from the steering wheel 14 to the steering shaft 22. A first clutch 38 is in operable communication with the steering shaft 6 and the first flywheel 26. Similarly, a second clutch 42 is in operable communication with the steering shaft 6 and the second flywheel 30. In this disclosed embodiment, upon operation of the automobile, the motor 34 rotates both the first and second flywheels 26, 30. It should be noted that the flywheels 26, 30 are rotating in opposite directions. When an operator turns the steering wheel 14, in a clockwise direction for instance, the first linkage 54 may be configured to axially move the steering shaft 22 to the left, e.g. in the direction of the left arrow 46. As the steering shaft 22 moves to the left, the second clutch 42 engages the second flywheel 30, thus transferring the rotative energy of the flywheel 30 to the steering shaft and thereby providing a power assist for the clockwise turning of the steering wheel. Similarly, when the operator turns the steering wheel 14 in a counter-clockwise direction, the first linkage 54 is configured to axially move the steering shaft 22 to the right, e.g. in the direction of the right arrow 50. As the steering shaft 22 moves to the right, the first clutch 38 engages the first flywheel 26, thus transferring the rotative energy of the flywheel 26 to the steering shaft 22 and thereby providing a power assist in the counter-clockwise turning of the steering wheel. Of course, the first linkage 54 may be configured such that a clockwise turn of the steering wheel 14 axially moves the steering shaft 22 to the right, however in that case the flywheels 26,30 would be configured to rotate in directions opposite to what was stated above. In this embodiment, the first flywheel 26 and first clutch 38 may be referred to as a first transmission and the second flywheel 30 and second clutch 42 may be referred to as a second transmission.

In another embodiment, there may be only one flywheel 26 in operable communication with the steering shaft 22. In still another embodiment, the flywheel(s) may be omitted, and instead the inertia of the motor itself may be used to transmit a power assist to the steering shaft.

Figure 2:
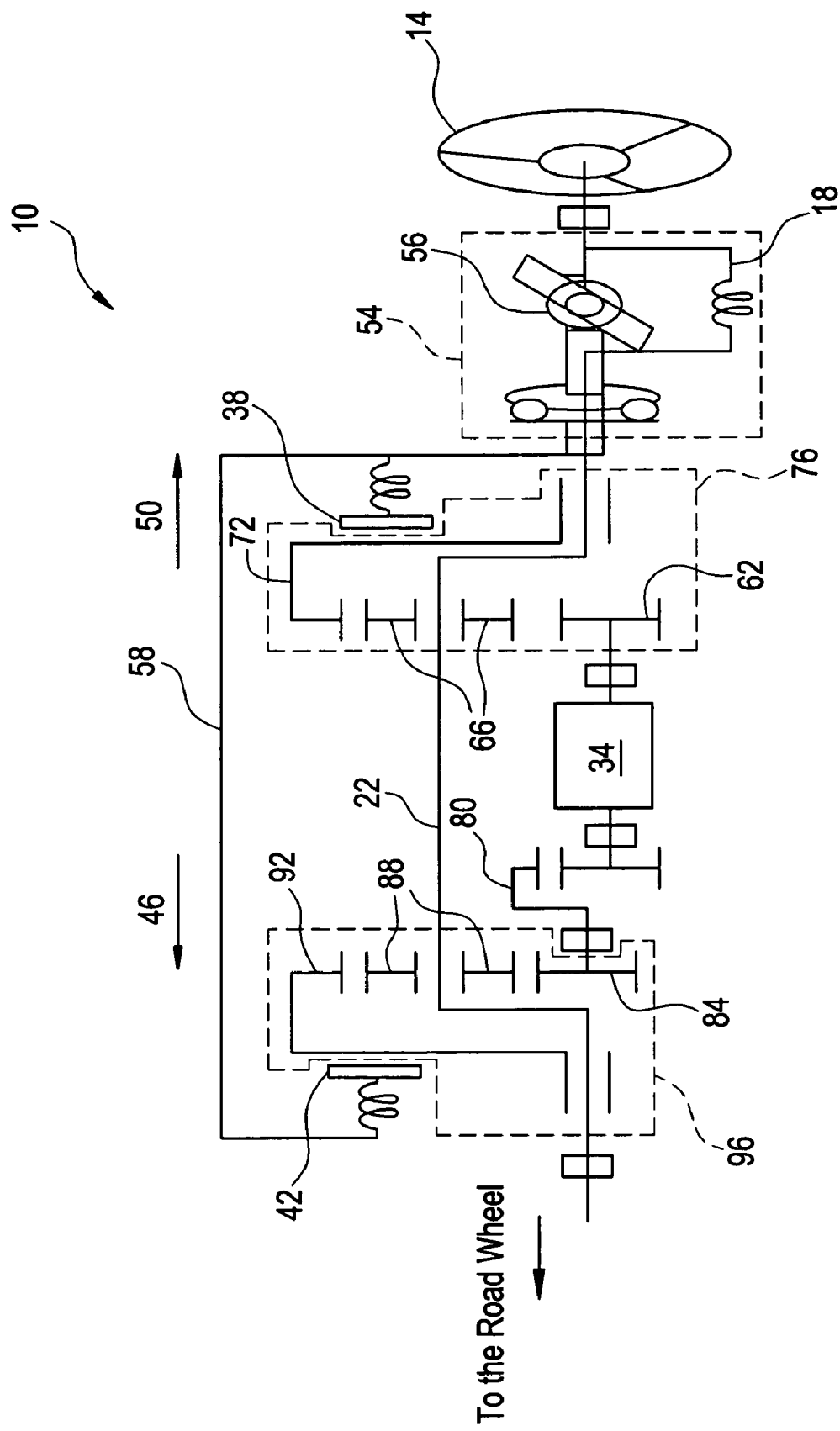
FIG. 2 is a schematic view of a planetary gear embodiment of the disclosed electric power system.

FIG. 2 shows another embodiment of the disclosed steering system. A steering wheel 14 is in operable communication with a first linkage 54. The first linkage 54 may comprises a torsion bar 18, and a cam 56. The cam may be selected from any of a number of cam devices, including, but not limited to: ball in helical groove, 4-bar linkage, and ball screw. The cam 56 shown happens to be a ball in helical groove. In this schematic diagram, the torsion bar 18 is shown radially displaced from the cam 56, however, it is contemplated that the torsion bar 18 would be concentric with the cam 56. The first linkage 54 is in operable communication with the steering shaft 22. The steering shaft 22 is in operable communication with at least one road wheel (not shown). The steering shaft is also in operable communication with a steering shaft sleeve 58. The steering shaft sleeve is in operable communication with a first clutch 38 and a second clutch 42. A motor 34 is in operable communication with a first sun gear 62. The first sun gear is in operable communication with a first planet gear 66. The first planet gear 66 is in operable communication with a first ring gear 72. The first ring gear is in operable communication with the first clutch 38. The first sun gear 62, first planet gear 66, and first ring gear 72 all comprise a first planetary gear 76. The motor 34 is also in operable communication with a gear system 80 which changes the rotation input to an output rotation in the opposite direction. The gear system 80 is in operable communication with a second sun gear 84. The second sun gear 84 is in operable communication with a second planet gear 88. The second planet gear 88 is in operable communication with a second ring gear 92. The second ring gear 92 is in operable communication with the second clutch 42. The second sun gear 84, second planet gear 88, and second ring gear 92 all comprise a second planetary gear 96. When the steering system 10 is in operation, the motor 34 is configured to rotate the first ring gear 72 in one direction, which for this example may be clockwise, looking from the steering wheel 14 to the steering shaft 22. Since the output of the motor 34 is going through the gear system 80, the output of the gear system 80 causes the second ring gear 92 to rotate in the opposition direction from the first ring gear 72. Thus, when the steering wheel 14 is turned in a clockwise direction, for example, the steering shaft 14 and steering shaft sleeve 58 may be configured to move axially to the left, in the direction of the left arrow. Although the steering shaft 22 and steering shaft sleeve 58 are axially moveable, the motor 34 and planetary gears 76, 96 are axially stationary. As the steering shaft sleeve 58 moves to the left, the first clutch 38 will engage the first ring gear 72, thus transferring rotative energy from the ring gear to the steering shaft sleeve 58, and ultimately to the steering shaft 22, thereby providing power assist to the steering wheel operator. Similarly, when the steering wheel 14 is turned in a counter-clockwise direction, the steering shaft 14 and steering shaft sleeve 58 may be configured to move axially to the right, in the direction of the right arrow 50. As the steering shaft sleeve 58 moves to the right, the second clutch 42 will engage the second ring gear 92, thus transferring rotative energy from the ring gear 92 to the steering shaft sleeve 58, and ultimately to the steering shaft 22, thereby providing power assist to the steering wheel operator.

Figure 3:
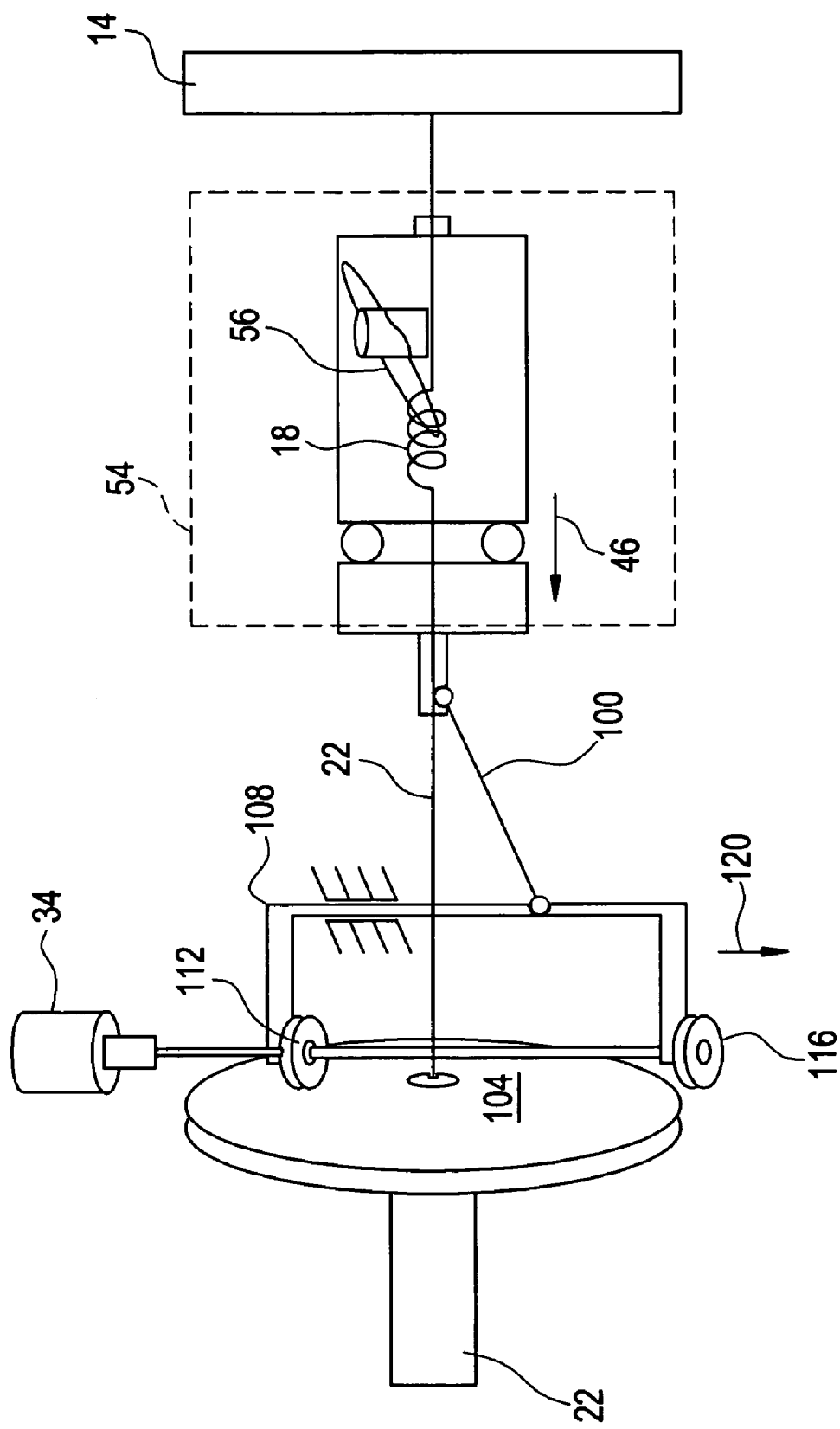
FIG. 3 is a schematic view of a driven disk embodiment of the disclosed electric power system.
Figure 4:
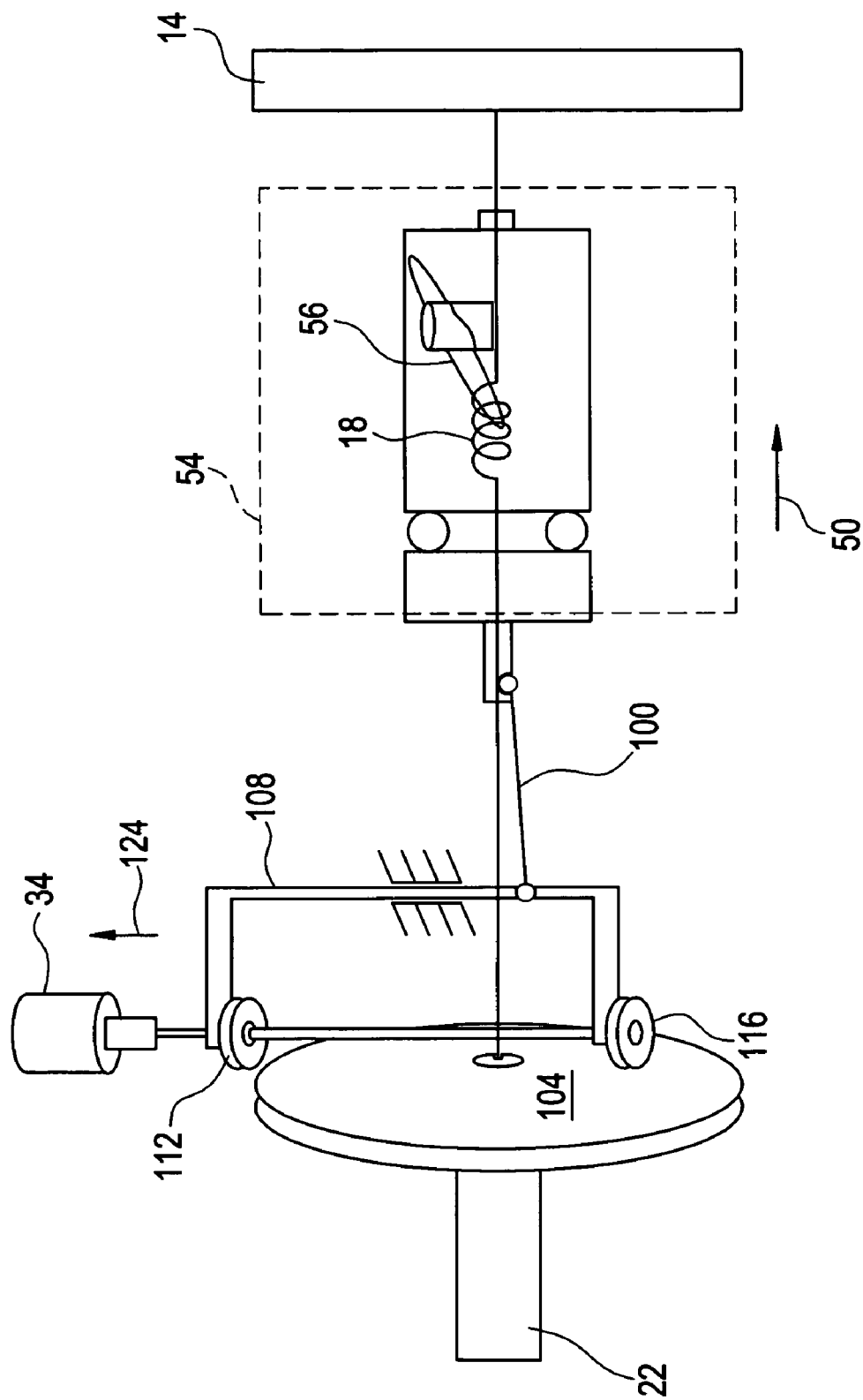
FIG. 4 is a schematic view of the driven disk embodiment of FIG. 3 in a different mode of operation.

FIG. 3 shows another embodiment of the steering system 10. A steering wheel 14 is shown in operable communication with a first linkage 54. In this view the torsion bar 18 is shown concentric with the cam 56. The first linkage 54 is in operable communication with a steering shaft 22. The steering shaft is in operable communication with a second linkage 100. The steering shaft is also in operable communication with a driven disk 104. Additionally, the steering shaft 22 is also in operable communication with at least one road wheel (not shown). A motor 34 is in operable communication with a third linkage 108. The motor is also in operable communication with a first driver disk 112 and a second driver disk 116. The motor 34 is configured to rotate both discs 112, 116 in the same direction, e.g. clockwise or counter-clockwise. The third linkage 108 is in operable communication with the second linkage 100. The steering system may be configured such that when the steering wheel is turned clockwise (as one looks from the steering wheel 14 to the steering shaft 22), the first linkage 54 moves to the left in the direction of the left arrow 46. This causes the second linkage 100 and the third linkage 108 to act in concert and cause the first driver disk 112 and second driver disk 116 to move radially in the direction of the down arrow 120 such that only the first driver disk 112 is in contact with the driven disk 104. If the motor is configured to turn the driver disks 112, 116 in a counter-clockwise direction, (as one looks from the driver disks 112, 116 towards the motor), then the first driver disk 112 will turn the driven disk 104 in a clockwise direction (as one looks from the steering wheel 14 to the steering shaft 22), thereby providing a power assist to the clockwise turning of the steering wheel 14. Referring now to FIG. 4, when the steering wheel is turned counter-clockwise (as one looks from the steering wheel 14 to the steering shaft 22), the first linkage 54 moves to the right in the direction of the right arrow 50. This causes the second linkage 100 and the third linkage 108 to act in concert and cause the first driver disk 112 and second driver disk 116 to move radially in the direction of the up arrow 124 such that only the second driver disk 116 is in contact with the driven disk 104. Since in this embodiment, the motor 34 is configured to turn the driver disks 112, 116 in a counter-clockwise direction, (as one looks from the driver disks 112, 116 towards the motor), then the second driver disk 116 will turn the driven disk 104 in a counter-clockwise direction (as one looks from the steering wheel 14 to the steering shaft 22), thereby providing a power assist to the counter-clockwise turning of the steering wheel 14. When the steering wheel is not being turned, the steering system 10 will be positioned such that neither the first driver disk 112 nor the second driver disk 116 will be in contact with the driven disk 104, thus in this position, no power steering assist is being provided.

Figure 5:
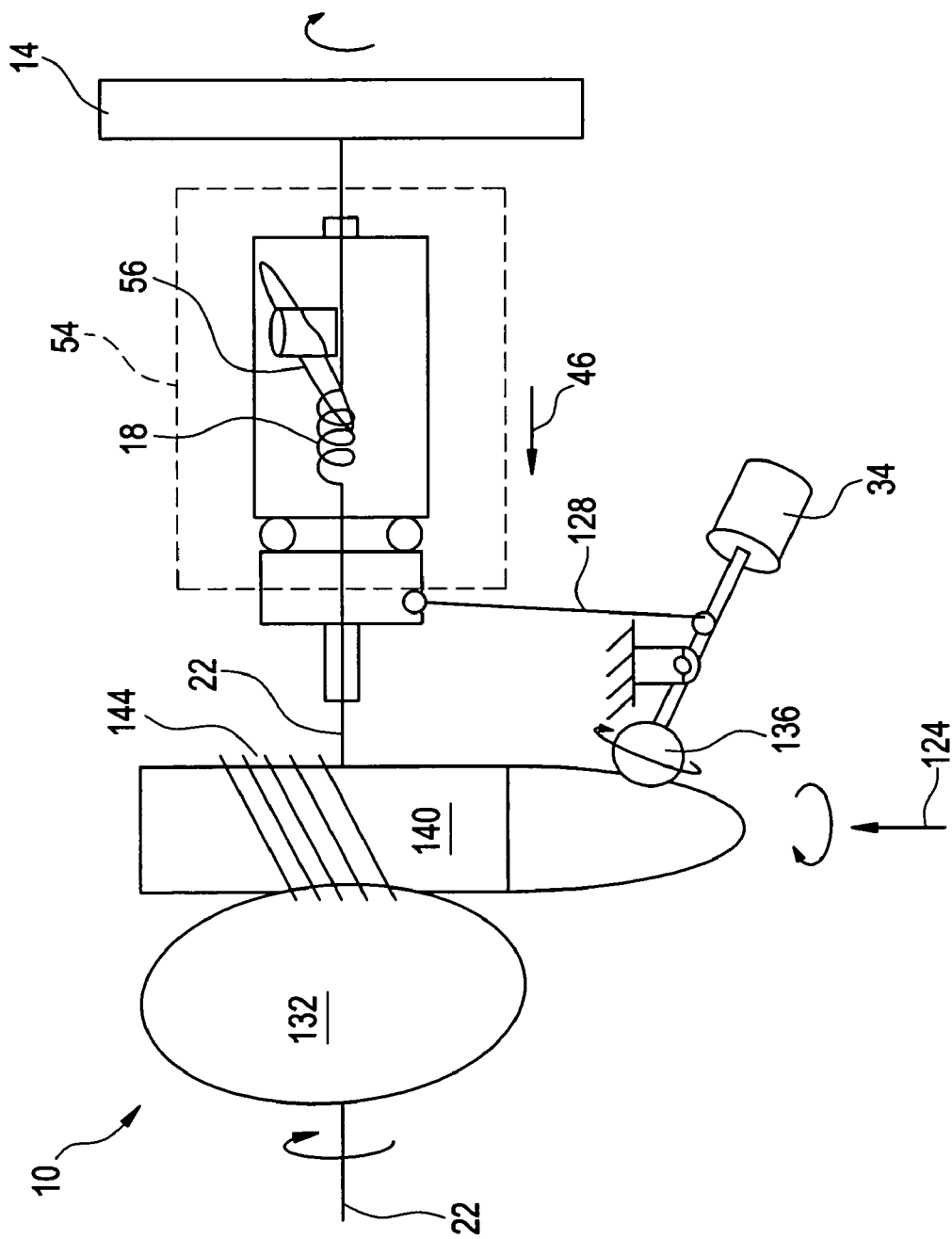
FIG. 5 is a schematic view of a driven body embodiment of the disclosed electric power system.
Figure 6:
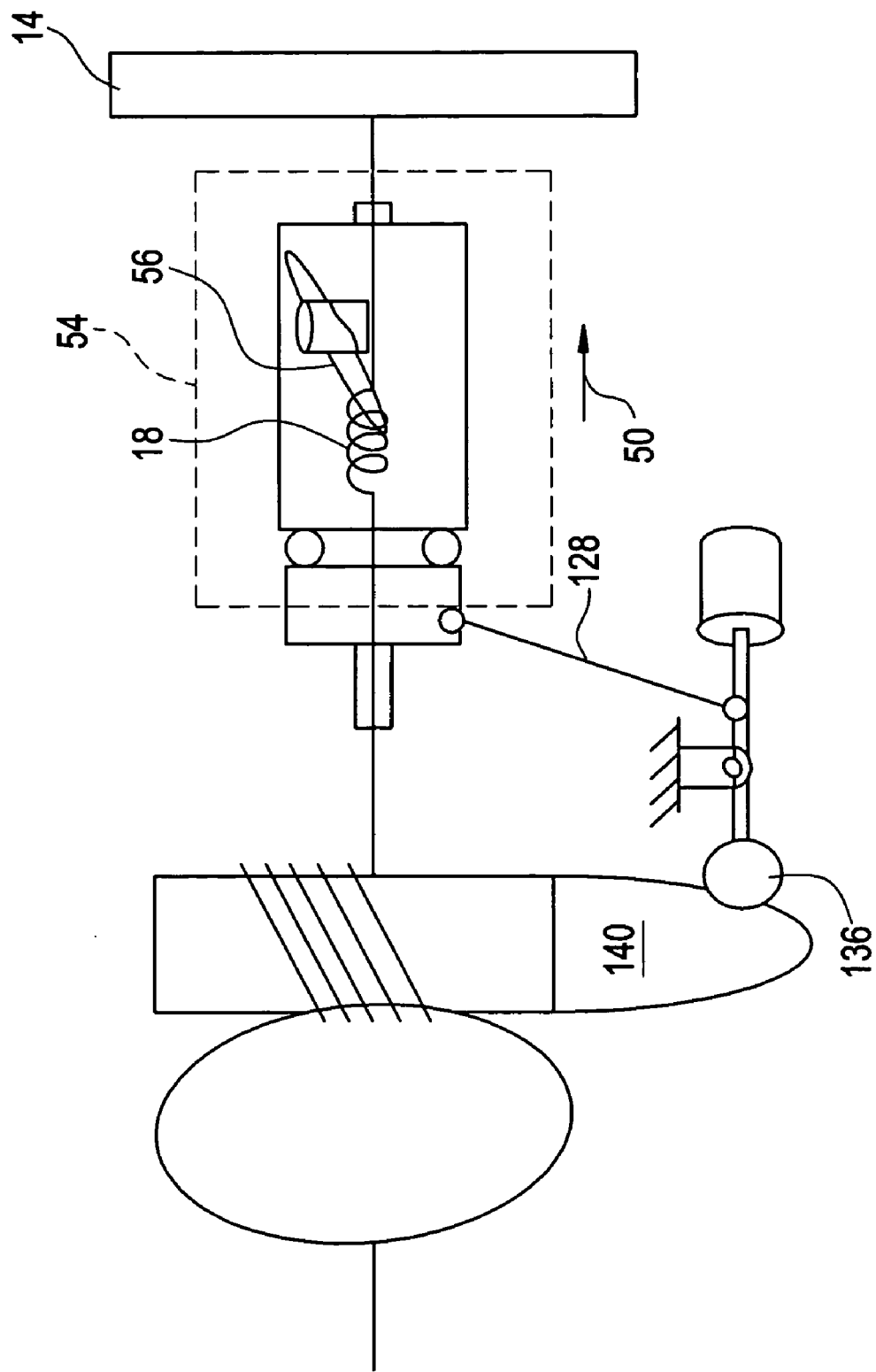
FIG. 6 is a schematic view of the driven body embodiment of FIG. 5 in a different mode of operation.

FIG. 5 shows another embodiment of the steering system 10. A steering wheel 14 is shown in operable communication with a first linkage 54 and a torsion bar 18. The torsion bar 18 is in operable communication with a steering shaft 22. The steering shaft is in operable communication with a driver sphere linkage 128. The steering shaft is also in operable communication with a driven gear 132. The steering shaft is also in operable communication with at least one road wheel (not shown). A motor 34 is in operable communication with the driver body linkage 128. Additionally the motor 34 is in operable communication with a driver body 136, and is be configured to rotate the driver body 136 in one direction. For this embodiment, the driver body 136 is rotated clockwise (as one looking from the motor to the driver sphere). The driver body 136 is operable communication with a driven body 140. The driven body has a curved surface that is in contact with a curved surface of the driver body 136. The driven body also has a worm gear 144 that is in operable communication with the driven gear 132. The driver body 136 and driven body 140 are configured such that when the contact angle of the driver body 136 to the driven body is perpendicular to the surface of the driven body, then the rotating driver body will not rotate the driver body 140. However, if the contact angle between driver body 136 and the driven body 140 is less than perpendicular, as shown in FIG. 5, then the clockwise rotating driver body 136 will rotate the driven body 140 in a counter-clockwise direction (as one looks in the direction of the up arrow 124). Similarly, if the contact angle between driver body 136 and the driven body 140 is greater than perpendicular, as shown in FIG. 6, then the clockwise rotating driver body 136 will rotate the driven body 140 in a clockwise direction (as one looks in the direction of the up arrow 124). The driver body and driven body may be comprised of any of a variety of curved shapes, including, but not limited to: ovoid, spherical and semi-spherical. The worm gear 144, when rotating counter-clockwise (as one looks from the steering wheel to the steering shaft) will rotate the driven gear clockwise (as one looks from the steering wheel to the steering shaft), and when the worm gear 144 is rotating clockwise (as one looks from the steering wheel to the steering shaft), it will rotate the driven gear counter-clockwise (as one looks from the steering wheel to the steering shaft). Of course, these gears may be configured differently for other embodiments, e.g. when the worm gear 144 is rotating counter-clockwise, the driven gear 132 may rotate counter-clockwise, etc. Thus, the steering system 10 may configured such that when the steering wheel is turned clockwise (as one looks from the steering wheel 14 to the steering shaft 22), the first linkage 54 moves to the left in the direction of the left arrow 46. This causes the driver body linkage 128 to move the driver sphere out of perpendicular contact with the driven body 140, and take a contact angle less than perpendicular with respect to the driven body, thereby causing the driven body 140 to rotate in a counter-clockwise direction (as one looks in the direction of the up arrow 124). This causes the worm gears 144 to also rotate in a counter-clockwise direction (as one looks in the direction of the up arrow 124), thereby causing the driven gear 32 to rotate in a clockwise direction (as one looks from the steering wheel 14 to the steering shaft 22) and thus provide power assist to the clockwise turning of the steering wheel 14. Referring now to FIG. 6, when the steering wheel 14 is turned counter-clockwise (as one looks from the steering wheel 14 to the steering shaft 22), the first linkage 54 moves to the right in the direction of the right arrow 50. This causes the driver body linkage 128 to move the driver sphere 136 out of perpendicular contact with the driven body 140, and assume a contact angle greater than perpendicular with respect to the driven body 140, thereby causing the driven body 140 to rotate in a clockwise direction (as one looks in the direction of the up arrow 124). This causes the worm gears 144 to also rotate in a clockwise direction (as one looks in the direction of the up arrow 124), thereby causing the driven gear 32 to rotate in a counter-clockwise direction (as one looks from the steering wheel 14 to the steering shaft 22) and thus provide power assist to the counter-clockwise turning of the steering wheel 14.

The disclosed power steering system allows for the use of low cost components such as standard inertia single direction motors. Also, since the electric power steering system essentially uses a mechanical coupling between the steering wheel and motor, there is no need for expensive components such as a torque measuring device to measure the torque an operator exerts on a steering wheel or a position measuring device to indicate how far the steering wheel is being turned. Further, the disclosed power steering system can use a motor that is constantly running in one direction during the operation of the vehicle. There is no need to start and stop the motor, even when changing the steering wheel direction. Therefore, since the motor and components being driven by the motor do not need to start and stop, the power consumption required to overcome the stand-still inertia and stand-still load is no longer necessary, thereby lowering the power consumption of the disclosed power steering system. Additionally, since the motor is unidirectional, there is very little backlash among the coupled components. Also, since the motor is unidirectional and constantly running during vehicle operation, electromagnetic interference ("EMI") issues are minimized. In addition, the motor can be connected directly to the power supply and so the controller can be greatly simplified or eliminated completely.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. An electric power steering system, comprising:
   a steering wheel in operable communication with a mechanical linkage;
   a steering shaft in operable communication with the mechanical linkage, and in operable communication with at least one road wheel;
   a first transmission in operable communication with the steering shaft;
   a unidirectional electric motor in operable communication with the first transmission;
   wherein the electric power steering system is configured such that when the steering wheel is turned in a first direction, the motor's power is transmitted in the first direction to the steering shaft, and when the steering wheel is turned in a second direction, the motor's power is transmitted in the second direction to the steering shaft;
   and wherein the mechanical linkage comprises:
   a cam.

2. The electric power steering system of claim 1, wherein the unidirectional motor is configured to operate using a constant power source.

3. The electric power steering system of claim 1, further comprising:
   a second transmission in operable communication with the steering shaft and in operable communication with the motor; and
   wherein the electric power steering system is further configured such that when the steering wheel is turned in a first direction, the motor transmits a power assist in the first direction to the steering shaft via the first transmission, and when the steering wheel is turned in a second direction, the motor transmits a power assist in the second direction to the steering shaft via the second transmission.

4. The electric power steering system of claim 3, wherein the first transmission comprises:
   a first sun gear;
   a first planet gear in operable communication with the first sun gear;
   a first ring gear in operable communication with the first planet gear;
   a steering shaft sleeve in operable communication with the steering shaft;
   a first clutch in operable communication with the first ring gear and the steering shaft sleeve and configured to transmit rotative energy from the first ring gear to the steering shaft sleeve; and
   wherein the second transmission comprises:
   a second sun gear;
   a second planet gear in operable communication with the second sun gear;
   a second ring gear in operable communication with the second planet gear;
   a steering shaft sleeve in operable communication with the steering shaft; and
   a second clutch in operable communication with the second ring gear and the steering shaft sleeve and configured to transmit rotative energy from the second ring gear to the steering shaft sleeve.

5. The electric power steering system of claim 3 further comprising a first clutch in communication with the first transmission and a second clutch in communication with the second transmission.

6. The electric power steering system of claim 5 further comprising a steering shaft sleeve in operable communication with the steering shaft and in communication with the first clutch and the second clutch, wherein rotatitive energy from the first transmission is transmitted to the steering shaft sleeve through the first clutch, and wherein rotative energy from the second transmission is transmitted to the steering shaft sleeve through the second clutch.

7. The electric power steering system of claim 3 further comprising a gear system operably positioned between the motor and the second transmission, wherein the gear system changes rotation input in a first direction to an output rotation in an opposite direction from the first direction.

8. The electric power steering system of claim 1, wherein the mechanical linkage further comprises:
   a torsion bar.

9. The electric power steering system of claim 1, wherein the cam comprises:
   a ball in a helical groove.

10. The electric power steering system of claim 1, wherein the cam comprises:
    a 4-bar linkage.

11. The electric power steering system of claim 1, wherein the cam comprises:
    a ball screw.

12. An electric power steering system, comprising:
    a steering wheel in operable communication with a mechanical linkage;
    a steering shaft in operable communication with the mechanical linkage, and in operable communication with at least one road wheel;
    a first transmission in operable communication with the steering shaft;
    a unidirectional electric motor in operable communication with the first transmission;
    wherein the electric power steering system is configured such that when the steering wheel is turned in a first direction, the motor's power is transmitted in the first direction to the steering shaft, and when the steering wheel is turned in a second direction, the motor's power is transmitted in the second direction to the steering shaft; and
    wherein the first transmission includes a first planetary gear in operable communication with the motor and a first clutch in operable communication with the first planetary gear, wherein the first clutch is configured to transmit rotative energy from the first planetary gear to a steering shaft sleeve.

13. The electric power steering system of claim 12 further comprising a second transmission including a second planetary gear in operable communication with the motor and a second clutch in operable communication with the second planetary gear, wherein the second clutch is configured to transmit rotative energy from the second planetary gear to the steering shaft sleeve.

14. The electric power steering system of claim 13 further comprising a gear system positioned between the motor and the second planetary gear, wherein the gear system changes rotation input in a first direction to an output rotation in an opposite direction from the first direction.

15. The electric power steering system of claim 13 wherein the steering shaft and steering shaft sleeve are axially movable and the first and second planetary gears and the motor are axially stationary.

16. A steering system comprising:
- a steering shaft;
- a first transmission in operable communication with the steering shaft;
- a second transmission in operable communication with the steering shaft;
- a motor in operable communication with both the first transmission and the second transmission; and,
- a gear system operably positioned between the second transmission and the motor, wherein the gear system changes rotation input in a first direction to an output rotation in an opposite direction from the first direction and wherein the first transmission includes a first planetary gear and the second transmission includes a second planetary gear.

17. The steering system of claim 16 further comprising a first clutch in operable communication with the first transmission and configured to transmit rotative energy from the fist transmission to the steering shaft, and a second clutch in operable communication with the second transmission and configured to transmit rotative energy from the second transmission to the steering shaft.

18. The steering system of claim 16 wherein, when a steering wheel associated with the steering system is turned in a first direction, the motor transmits a power assist in the first direction to the steering shaft via the first transmission, and when the steering wheel is turned in a second direction, the motor transmits a power assist in the second direction to the steering shaft via the second transmission.

19. A steering system comprising:
- a steering shaft;
- a first transmission in operable communication with the steering shaft;
- a second transmission in operable communication with the steering shaft;
- a motor in operable communication with both the first transmission and the second transmission; and,
- a gear system operably positioned between the second transmission and the motor, wherein the gear system changes rotation input in a first direction to an output rotation in an opposite direction from the first direction;
- wherein the first and second planetary gears each include a sun gear, a planet gear, and a ring gear.

20. The steering system of claim 19 further comprising a first clutch in operable communication with the first transmission and configured to transmit rotative energy from the first transmission to the steering shaft, and a second clutch in operable communication with the second transmission and configured to transmit rotative energy from the second transmission to the steering shaft.

21. The steering system of claim 19 wherein, when a steering wheel associated with the steering system is turned in a first direction, the motor transmits a power assist in the first direction to the steering shaft via the first transmission, and when the steering wheel is turned in a second direction, the motor transmits a power assist in the second direction to the steering shaft via the second transmission.

* * * * *